Sept. 20, 1960 W. GERMANN 2,952,917
MICROMETERS
Filed Sept. 16, 1958 4 Sheets-Sheet 1
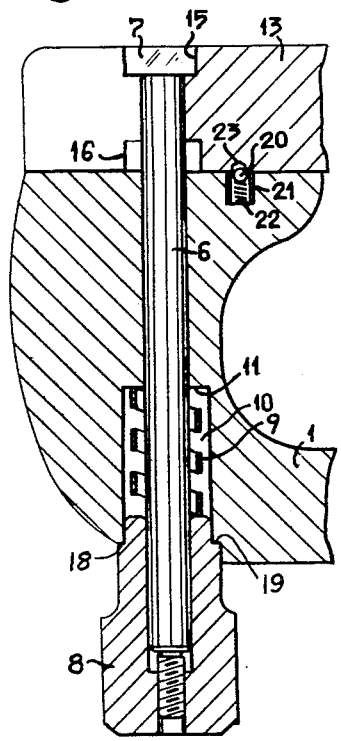
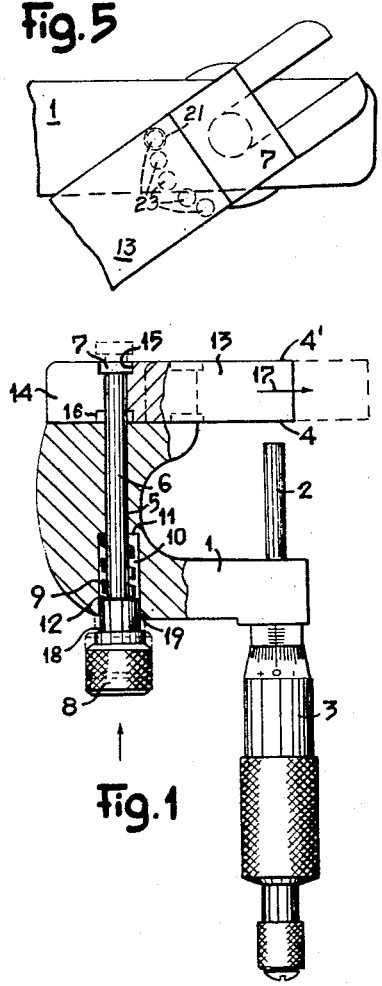
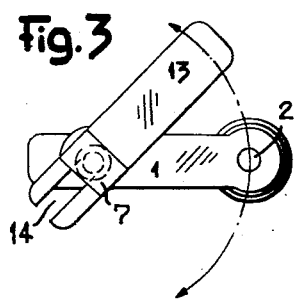
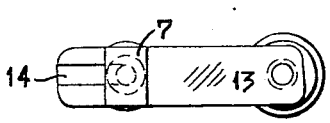
INVENTOR
WERNER GERMANN
BY Emory L. Groff
ATTORNEY

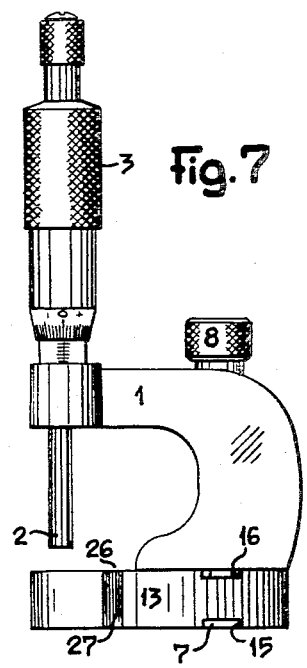
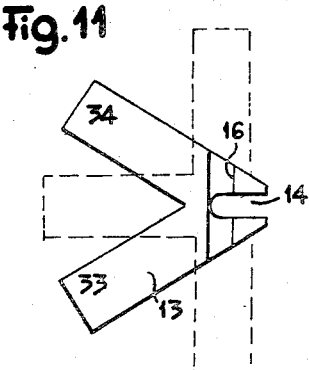
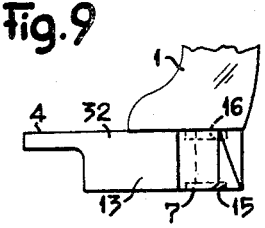
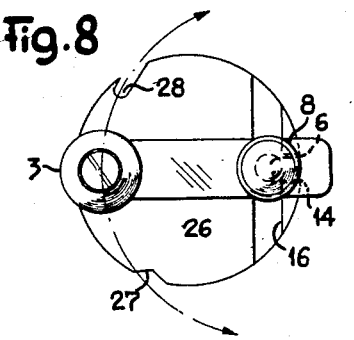
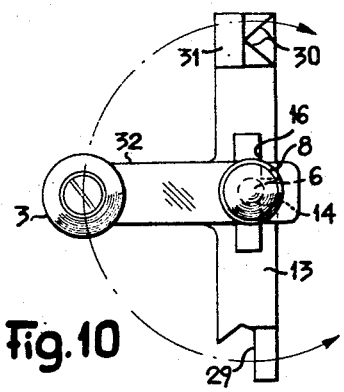

Sept. 20, 1960 W. GERMANN 2,952,917
MICROMETERS
Filed Sept. 16, 1958 4 Sheets-Sheet 4
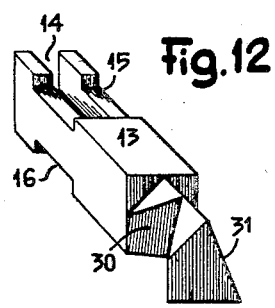
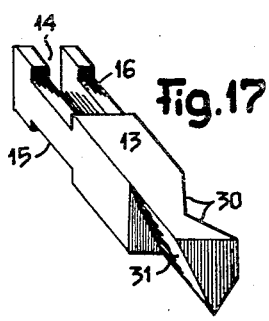
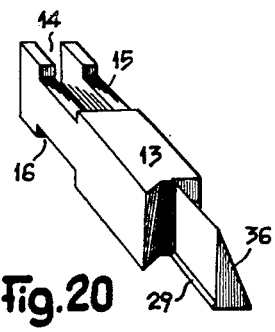
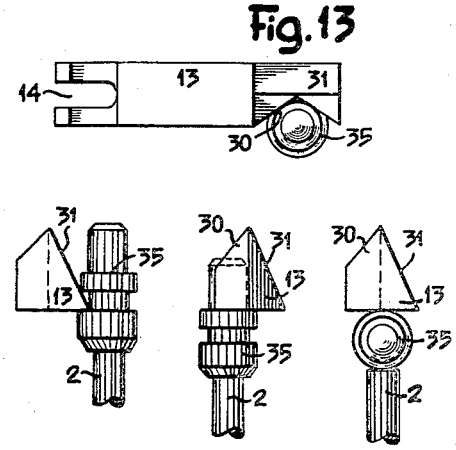
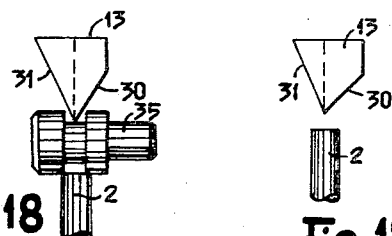
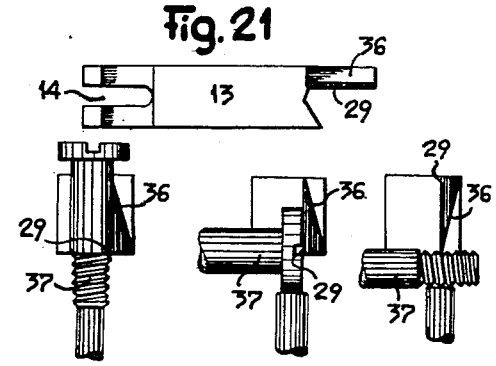
INVENTOR
WERNER GERMANN
BY
ATTORNEY United States Patent Office 2,952,917
Patented Sept. 20, 1960

2,952,917
MICROMETERS

Werner Germann, Via Bottogno, Viganello-Lugano, Switzerland

Filed Sept. 16, 1958, Ser. No. 761,360

Claims priority, application Switzerland Oct. 7, 1957

3 Claims. (Cl. 33—164)

Some types of micrometers are already known wherein the measuring rod, of which the movement is effected by a micrometric screw, may be moved angularly relatively to a stop, about an axis parallel to the spindle of the measuring rod.

On the other hand, micrometers are known in which the stop, against which the part to be measured is secured in a removable manner on the body of the micrometer and for this reason is interchangeable.

The present invention has for its subject a micrometer combining the advantages of the two types of micrometers indicated above and thus permitting of effecting measurements of precision which it is impossible to make previously by means of one of the types of known micrometers.

The micrometer according to the invention comprises, like known micrometers, a body carrying, on the one hand, a measuring rod movable by a micrometer screw and, on the other hand, a stop, the measurement of the distance being effected between said stop and the corresponding end of the measuring rod. Said micrometer is characterised by the fact that the stop is secured in a removable and interchangeable manner on the body by means of a tightening rod located parallel to the measuring rod, said tightening rod constituting simultaneously a hinge axis for the stop which can thus be directed in planes different from that passing through the geometrical axis of the two rods (measuring rod and tightening rod), in such a manner as to permit of presenting the stop in different positions relatively to the measuring rod.

A number of forms of construction of the micrometer according to the invention are shown diagrammatically and by way of example in the accompanying drawings, wherein:

Fig. 1 is a view in side elevation of the micrometer according to the first form of construction.

Figs. 2 and 3 show the same micrometer seen on end in two different positions of the stop.

Figure 6:
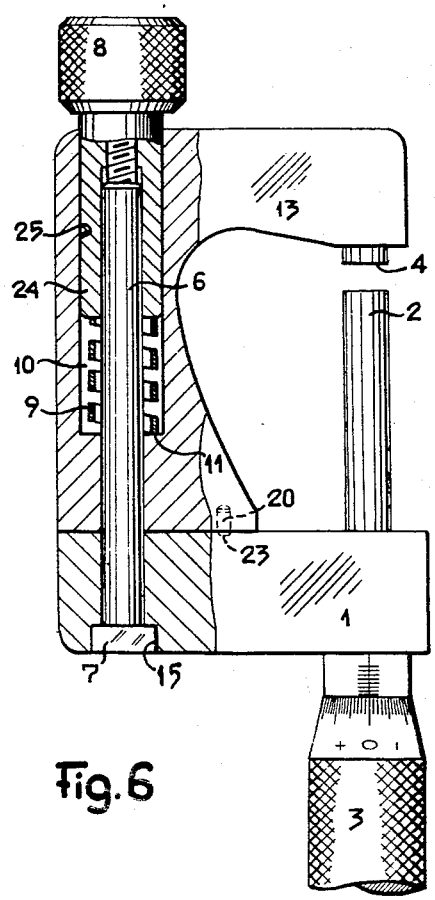

Figs. 4 and 5 relate to a modification of the micrometer according to the first form of construction.

Fig. 6 is a view in elevation, partly in section, of the micrometer according to a second form of construction.

Fig. 7 is a view in elevation of a third form of construction, of which

Fig. 8 is a top plan view.

Figs. 9 to 11 show modifications of this third form of construction.

Fig. 12 shows in perspective a removable stop for a micrometer according to the invention.

Fig. 13 shows said same stop viewed in plan.

Figs. 14 to 16 show the utilisation of a measuring stop of this character in three different cases.

Fig. 17 shows the same stop as that shown in Fig. 12, but in the reversed position.

Figs. 18 and 19 show two examples of use of said stop reversed relatively to a micrometric rod of a micrometer according to the invention.

Fig. 20 shows in perspective another form of construction of the measuring stop, of which Fig. 21 is a view in plan.

Figs. 22 to 24 show three examples of use of said last stop for effecting measurements, particularly on a screw.

The micrometer shown with reference to Figs. 1 to 3, comprises a body 1 carrying, on the one hand, a measuring rod 2 of which the axial movement is controlled by means of a micrometric screw device 3. The body 1 carries, on the other hand, a stop 4, against which is adapted to bear the part to be measured. Said stop 4 is mounted in a removable and interchangeable manner relatively to the body 1 of the micrometer. In fact, the body 1 is provided with a bore 5 in which is engaged a tightening rod 6 located parallel to the measuring rod 2.

Said tightening rod 6 carries at one of its ends a prismatic head 7. The other end of said rod 6 is screw-threaded and a nut 8, with a milled head, is screwed thereon. Further, a spring 9 is located in a seating 10 of the body 1. Said spring 9 surrounds the rod 6 and bears, at one end, against the bottom 11 of the seating 10 and at the other end, against the front part 12 of the nut 8. Said spring 9 thus tends to move the rod 6 in the direction of the micrometer device 3.

The part 13 carrying the measuring stop 4 has a slot 14 permitting the engagement of said part 13 about the rod 6 by transverse movement of said rod 6 in the slot 14. Said part 13 is also provided with two transverse grooves 15 and 16 of which the cross-section corresponds with the cross-section of the prismatic head 7 carried by the rod 6. Said prismatic head 7 can thus engage in the groove 15 (or the groove 16 respectively, when the part 13 is inverted through 180° relatively to the rod 6) for maintaining the part 13 in the locked position against the body 1. In fact, the spring 9 tends itself to maintain said part 13 locked in the correct position against the body 1. However, the correct position of the part 13 relatively to the body 1 may also be guaranteed by screwing the nut 8 on the rod 6 in such a manner as to obtain an effective locking of the stop 4 relatively to the body 1.

When it is desired to replace a measuring stop 4 by another measuring stop of different shape, or when it is desired simply to reverse the part 13 carrying the stop 4 for bringing into the operative position a stop 4' located on the opposed face of the part 13, the screw 6 is first released by unscrewing the nut 8, after which said nut 8 may be used as a push button for moving the rod 6 axially against the action of the spring 9 in such a manner that the prismatic head 7 passes out of the groove 15 and occupies the position shown in dotted lines in Fig. 1. In this position of the rod 6, the part 13 may be disengaged in the direction of the arrow 17, either to be replaced by another part 13, or to be inverted through 180° and re-engaged around the rod 6. When pressure is released from the nut 8, the rod 6 together with its locking head 7 is returned to its initial axial position and thereafter the position of the new measuring stop relatively to the body 1 may again be guaranteed by locking the rod 6 by screwing the nut 8 thereon until its shoulder 18 bears against the corresponding face 19 of the body 1.

The rod 6 constitutes not only a tightening screw for maintaining the desired measuring stop 4 in position but constitutes also a hinge spindle permitting of moving the adjusting stop 4 for directing it into planes different from that passing through the geometrical axis of the two rods 2 and 6. It is thus possible to set the measuring stop 4 in different positions relatively to the measuring rod 2. Fig. 2 shows the part 13 in the position which it normally occupies on micrometers of usual construction, whilst Fig. 3 shows said same part 13 moved angularly relatively to the body 1 of the micrometer so as to allow of measurements on parts of special shapes.

The micrometer shown in modification in Figs. 4 and 5 has the same characteristics as that according to Fig. 1. However, said micrometer also comprises a device with notches permitting of fixing the adjusting stop successively in a number of angular positions determined relatively to the body 1 of the micrometer. In the example shown, said device with notches comprises a ball 20 located in a seating 21 of the body 1 and urged inwardly of said seating by a spring 22. The part 13 has a series of bores 23 located along an arc of a circle centered on the geometrical axis of the rod 6. The engagement of the ball 20 in one of said bores 23 ensures a stable angular position of the part 13 and of its measuring stop 4 in predetermined direction relatively to the body 1.

In the form of construction shown in Fig. 6, the micrometer comprises the same elements as in the first form of construction. However, the part 13 carrying the measuring stop 4 has an L-shape. The nut 8 has an extension 24 engaged in a bore 25 of a corresponding diameter of the part 13. The seating 10, provided for the spring 9, is no longer formed in the body 1 but in the part 13 itself. Said seating 10 is formed by the bore 25. In this form of construction, the nut 8 bears against the part 13 in the clamped position, whilst the prismatic head 7 fits into a groove 15 provided in the body 1. The bottom 11 against which the spring 9 bears, is thus located on the part 13 itself. Means are also provided in this form of construction for allowing of tactile positioning of the part 13 and its measuring stop 4 to permit a variety of angular adjustments between the stop 4 and measuring rod 2. In this modification the bores or notches 23 are disposed in the body portion 1 while the spring urged ball is carried by a seating 21 in the part 13.

The micrometer shown in Fig. 7 is similar to that shown in Fig. 1, except that the part 13 carrying the adjusting stop 4 or the various adjusting stops 4 is established according to another conception. In fact, in this form of construction according to Fig. 7, the part 13 has the general shape of a circular plate (see particularly Fig. 8). Consequently said part 13 may be used as a foot or base to allow the micrometer to be placed vertically on a table, for example. Said part 13 is also provided with a slot 14, for its engagement around the tightening rod 6 and with grooves 15 and 16 for the engagement of the prismatic head 7 of the rod 6. The measuring rod 2 may therefore be disposed in different planes of orientation relatively to the measuring plate 26 which is constituted by the face of the part 13 situated opposite the rod 2. In the example according to Fig. 8, the plate 26 has two notches 27 and 28 of a particular shape adapted to permit of measuring parts of different shapes.

Fig. 9 and 10 show a modification in construction of the part 13 with which the micrometer according to Fig. 7 may be provided. As will be seen in Fig. 10, according to this modification, the part 13 has the general shape of a T. It is also provided, in its central portion, with a slot 14 for the engagement of the tightening rod 6, as also the grooves 15 and 16, for the engagement of the prismatic head 7 of the rod 6. Measuring stops constituting different measuring points formed either by faces or by stop edges, are provided at the end of the part 13 of T-shape. One of the measuring stops is constituted by a stop edge 29, another by two faces located in the form of a dihedron 30, the measuring stop adjacent said stop 30 being constituted in the form of an inclined plane 31. The third arm 32 of said part 13 in the form of a T, may carry a plain stop of conventional shape, such as the stop 4 according to Fig. 1. By directing the measuring rod 2 along one or other of the three arms of the part 13, it becomes possible to effect different measurements on parts of complex shape. The reversal of the part 13 relatively to the body 1 permits of a new series of possibilities of measuring by means of stops of different shapes.

Fig. 11 shows again a novel modification of the part 13 capable of constituting a foot for the micrometer. According to this modification, said part 13 has two arms 33 and 34 arranged in the general shape of a V. Each of said arms 33 and 34 may carry on its different faces measuring stops of various shapes.

In a further modification of this form of construction according to Fig. 11, it is possible to provide the part 13 with three supplementary arms, as indicated in dotted lines, in such a manner that the part 13 has five arms carrying different measuring stops. The part 13, as will be understood may have any number of arms, arranged in the form of a fan, square or otherwise.

Figs. 12, 13 and 17 are detail views of a reversible part 13 of determined shape. In this will be recognized the slot 14, as well as the grooves 15 and 16 for the engagement of the prismatic head 7 of the tightening rod 6. At the end of said part 13 opposed to the slot 14 is formed, on the one hand, a stop in the form of a dihedron 30 and, on the other hand, a stop in the form of an inclined plane 31.

Figs. 14, 15 and 16 show different possibilities of measuring which are available when using said part 13 in the position which it occupies in Fig. 12 for measuring the various sizes of a part 35.

Figs. 18 and 19 show other possibilities of measuring authorised by the same part 13 when it is disposed in the reversed position on the body of the micrometer.

Figs. 20 and 21 are views of a detail of a new part 13 of which the end opposed to the slot 14 has on one of its sides a measuring stop edge 29 and, on the other of its sides, an inclined plane 36 having an angle of inclination different from the inclined plane 31, provided by the part 13 according to Fig. 12.

Figs. 22, 23 and 24 show different possibilities of measuring when said part 13 has been used in one of its two positions relatively to the body 1 for measuring the sizes of an object such as a screw 37, for example.

The different forms of construction of the micrometer described above show clearly the numerous advantages which result by the utilisation on the micrometer of interchangeable measuring stops and which are simultaneously capable of being directed in different planes relatively to the measuring rod. It will be readily understood that these micrometers permit of a considerable increase in the number of possibilities of measurement permitted by a simple pocket micrometer, for example.

It will be understood that it is possible to conceive numerous modifications in construction of the micrometer hereinbefore described and in particular innumerable different forms of stops may be conceived.

I claim:

1. In a micrometer, a body, a measuring rod carried by said body and movable by means of a micrometric screw, a removable stop provided with a slot and mounted on said body and cooperating with the end of said measuring rod to define a measurable distance, said body also having an axial bore disposed parallel to said measuring rod, a tightening rod slidably journalled within said bore and having a threaded portion at one end and an enlarged head at its other end, said slot on said stop receiving the end of said tightening rod adjacent said head to clamp said removable stop in engagement with said body, a nut mounted on said threaded portion of the tightening rod, and a spring retained within said body abutting at one end against a fixed portion of said body and having its other end biased against said nut to urge said head on said rod towards said body and retain said stop in engaging relationship with said body, and whereby pressure on said nut against said spring causes axial movement of said rod to move said headway from clamping engagement with said body to permit adjustment of the stop to provide various angular positions with respect to said measuring rod, and also to effect detachment of the stop from the rod.

2. A micrometer according to claim 1 wherein said removable stop is provided with a transverse groove partially overlying said slot in the stop and providing a recess into which said head on said tightening rod engages.

3. A micrometer according to claim 1 wherein said nut is provided with an annular shoulder and the outer periphery of said bore adjacent said nut has a face cooperating with said shoulder to provide an abutment, whereby, axial movement of said tightening rod will be prevented when said nut is tightened to engage said shoulder with said face, and whereby, when said nut is loosened to separate said shoulder from said face, pressure on said nut will cause said head on the rod to be displaced from engagement with said stop.

References Cited in the file of this patent

UNITED STATES PATENTS

| | | |
|---|---|---|
| 1,361,406 | Romig | Dec. 7, 1920 |
| 2,541,821 | Kneissler | Feb. 13, 1951 |
| 2,816,363 | Cramer | Dec. 17, 1957 |